United States Patent [19]

Yamamoto et al.

[11] Patent Number: 5,236,984
[45] Date of Patent: Aug. 17, 1993

[54] COLD-CURABLE SILICONE RESIN COMPOSITION

[75] Inventors: Shigeyuki Yamamoto; Hiroshi Adachi; Hirofumi Fujioka; Hirozon Kanegae, all of Hyogo, Japan

[73] Assignee: Mitsubishi Denki Kabushiki Kaisha, Tokyo, Japan

[21] Appl. No.: 793,976

[22] Filed: Nov. 18, 1991

[30] Foreign Application Priority Data

Nov. 22, 1990 [JP] Japan ................... 2-318906
Feb. 21, 1991 [JP] Japan ................... 3-027102

[51] Int. Cl.$^5$ .................... C08K 5/20; C08L 83/07
[52] U.S. Cl. .................... 524/233; 524/588; 524/376; 524/356; 524/366; 524/378; 528/21; 528/33; 528/10
[58] Field of Search ............... 524/588, 376, 233, 356, 524/366, 378; 528/21, 33, 10; 525/474

[56] References Cited

U.S. PATENT DOCUMENTS

| | | | |
|---|---|---|---|
| 4,399,266 | 8/1983 | Matsumura et al. | 528/10 |
| 4,513,132 | 4/1985 | Shoji et al. | 528/21 |
| 4,678,610 | 7/1987 | Rich | 528/21 |
| 4,906,713 | 3/1990 | Sogah | 526/170 |
| 5,057,336 | 10/1991 | Adachi et al. | 528/10 |
| 5,079,299 | 1/1992 | Hisamoto et al. | 525/100 |
| 5,085,938 | 2/1992 | Watkins | 524/588 |
| 5,183,846 | 2/1993 | Aiba et al. | 528/10 |

FOREIGN PATENT DOCUMENTS 55-94955 7/1980 Japan.

Primary Examiner—Melvyn I. Marquis
Assistant Examiner—Karen A. Dean
Attorney, Agent, or Firm—Lowe, Price, LeBlanc & Becker

[57] ABSTRACT

Provided is a silicone resin composition, which is curable at a temperature of not more than 270° C., consisting essentially of a silicone ladder polymer expressed in the following general formula (I):

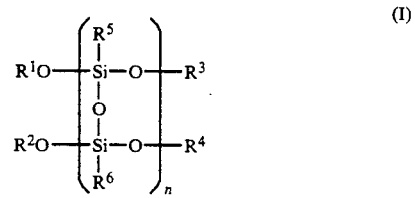

where $R^1$ to $R^4$ represent hydrogen atoms or lower alkyl groups respectively, $R^5$ and $R^6$ represent aryl groups, alkyl groups or alkenyl groups with alkenyl groups occupying at least 2% of 2n groups $R^5$ and $R^6$, and n represents an integer of 5 to 1600, an organic solvent, and/or 0.2 to 20.0 percent by weight of a catalyst with respect to the silicone ladder polymer. This composition is cured at a temperature of not more than 270° C., to form a thin film having excellent solvent resistance and heat resistance.

19 Claims, No Drawings

COLD-CURABLE SILICONE RESIN COMPOSITION

BACKGROUND OF THE INVENTION

1. Field of the Invention

The present invention relates to a silicone resin composition, which is curable at a temperature of not more than 270° C., particularly in a range of 150° to 270° C., for forming a thin film of a silicone ladder polymer.

2. Background of the Invention

A silicone ladder polymer, which is a ladder type silicone resin material, is well known as a heat resisting polymer. Such silicone ladder polymer has excellent heat resistance, water resistance and electrical insulability. In consideration of such properties, study has been made as to application of this polymer to a protective coat, an interlayer isolation film etc. for an electronic component or a semiconductor device.

In such application to an isolation film or the like, it is necessary to cure the silicone ladder polymer by heat treatment, in order to attain solvent resistance. According to Japanese Patent Laying-Open No. 55-94955 (1980), such heat treatment must be performed under a high temperature of at least 350° C. so that the silicone ladder polymer is not dissolved in a good solvent. Due to requirement for such high-temperature heat treatment, however, application of the polymer is restricted. In other words, it is impossible to form a thin film of this polymer, which has excellent solvent resistance, on a substrate or device which is inferior in heat resistance.

SUMMARY OF THE INVENTION

In order to solve the aforementioned problem, an object of the present invention is to provide a silicone resin composition which is curable at a lower temperature.

More specifically, the object of the present invention is to provide a silicone resin composition, which is curable at a temperature of not more than 270° C. for forming a silicone ladder polymer film of high purity having excellent heat resistance and solvent resistance.

The present invention provides a silicone resin composition, which is curable at a temperature of not more than 270° C., substantially consisting of:

a silicone ladder polymer expressed in the following general formula (I):

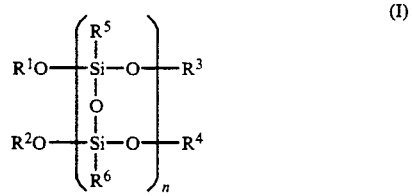

where $R^1$ to $R^4$ represent hydrogen atoms or lower alkyl groups respectively, $R^5$ and $R^6$ represent aryl groups, alkyl groups or alkenyl groups with alkenyl groups occupying at least 2% of 2n groups $R^5$ and $R^6$, and n represents an integer of 5 to 1600;

0.2 to 20.0 percent by weight of a catalyst with respect to the silicone ladder polymer; and an organic solvent.

The present invention further provides a silicone resin composition, which is curable at a temperature of not more than 270° C., substantially consisting of:

a silicone ladder polymer expressed in the following general formula (I):

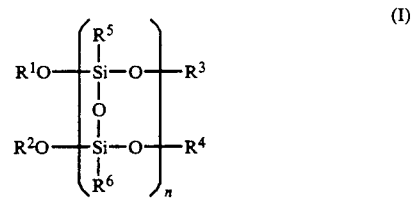

where $R^1$ to $R^4$ represent hydrogen atoms or lower alkyl groups respectively, $R^5$ and $R^6$ represent aryl groups, alkyl groups or alkenyl groups with alkenyl groups occupying at least 10% of 2n groups $R^5$ and $R^6$, and n represents an integer of 5 to 1600; and an organic solvent.

Due to its siloxane bond ladder structure, the silicone ladder polymer expressed in the above general formula (I) is rigid and hence excellent in heat resistance. Further, the aforementioned polymer is curable at a temperature of not more than 270° C. with a small amount of catalyst. The catalyst of a required amount exerts no influence on the characteristics of the as-formed thin film.

Further, the silicone ladder polymer expressed in the general formula (I), which contains at least 10% of alkenyl groups in 2n groups $R^5$ and $R^6$, is curable at a temperature of not more than 270° C. with employment of no catalyst.

As described above, the inventive composition which is prepared by combining this polymer with a solvent and/or a catalyst can form a thin film of a silicone ladder polymer having excellent solvent resistance at a lower temperature as compared with a general composition.

The silicone resin composition according to the present invention substantially consists of a silicone ladder polymer having high purity, an organic solvent, and/or a catalyst.

The silicone ladder polymer is expressed in the following general formula (I):

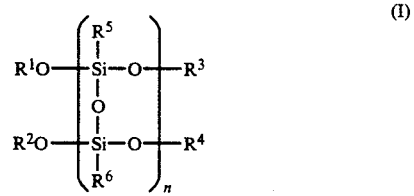

In this general formula (I), $R^1$ to $R^4$ represent hydrogen atoms or lower alkyl groups respectively. The lower alkyl groups include methyl, ethyl and propyl groups etc.

$R^5$ and $R^6$ represent aryl groups such as phenyl groups, alkyl groups such as methyl and ethyl groups, or alkenyl groups such as vinyl and ally groups. When the composition substantially consists of a silicone ladder polymer, a catalyst and an organic solvent, alkenyl groups occupy at least 2%, preferably 5 to 8%, of 2n groups $R^5$ and $R^6$. If the content of alkenyl groups is less than 2%, it is difficult to cure the polymer at a low temperature with the catalyst, and the temperature required for curing the polymer exceeds 270° C. When excellent heat resistance and electric characteristics are required, it is preferable to employ a silicone ladder polymer which contains a smaller amount of alkenyl groups. More specifically, the content of alkenyl groups is preferably not more than 10% in this case.

When the composition substantially consists of a silicone ladder polymer and an organic solvent with no catalyst, alkenyl groups preferably occupy at least 10%, more preferably at least 15%, of 2n groups $R^5$ and $^6$. If the content of alkenyl groups is less than 10%, it is difficult to cure the polymer at a low temperature, and the temperature required for curing the polymer exceeds 270° C.

Symbol n represents an integer of 5 to 1600, preferably 50 to 1000. If the number n is smaller than 5, it is difficult to form a thin film. If the number n exceeds 1600, on the other hand, it is difficult to dissolve the polymer in the solvent.

Such a silicone ladder polymer is prepared from poly(phenyl vinyl silsesquioxane), poly(allyl phenyl silsesquioxane), poly(methyl vinyl silsesquioxane), poly(allyl methyl silsesquioxane), poly(ethyl vinyl silsesquioxane), poly(allyl ethyl silsesquioxane), or the like.

When the aforementioned silicone ladder polymer is applied to a peripheral material for a semiconductor device, the polymer preferably contains not more than 1 p.p.m., more preferably not more than 0.8 p.p.m. each of alkali metal, iron, lead, copper and halogenated hydrogen. If the content exceeds 1 p.p.m., it is difficult to apply the polymer to a peripheral material for a semiconductor device, due to such impurities contained in the polymer. Further, the polymer preferably contains not more than 1 p.p.b., more preferably not more than 0.8 p.p.b. each of uranium and thorium. If the content exceeds 1 p.p.b., it is difficult to apply the polymer to a peripheral material for a semiconductor device due to such impurities contained in the polymer, similarly to the above.

The silicone ladder polymer can be synthesized using raw materials of trichlorosilane compounds or trialkoxysilane compounds, for example. Such raw materials are dissolved in an organic solvent, and hydrolyzed to synthesize a prepolymer as the result. Then, a polymerization catalyst is added to an organic layer containing this polymer, and heated to obtain a crude polymer. This crude polymer is so refined as to obtain a silicone ladder polymer having high purity.

The solvent employed in the present invention is not particularly restricted so far as the same can dissolve the silicone ladder polymer, or the silicone ladder polymer and a catalyst as described below. In consideration of dissolubility for the silicone ladder polymer, a preferable solvent is prepared from aromatic hydrocarbons such as toluene and xylene, ketones such as methyl isobutyl ketone and acetone, ethers such as tetrahydrofuran and isopropylether, anisole, N-methyl-2-pyrolidone, N,N-dimethylacetamide, or the like. In view of dissolubility for the catalyst, a preferable solvent is prepared from aromatic hydrocarbons such as xylene and benzene, ketones such as methyl isobutyl ketone and acetone, ethers such as tetrahydrofuran and isopropylether, anisole, ethyl cellosolve, N-methyl-2-pyrolidone, N,N-dimethylacetamide or the like. One of these materials may be selected, or at least two such materials may be combined with each other to prepare the solvent.

The content of the solvent, which is not particularly restricted, is preferably 2 to 20 parts by weight, more preferably 5 to 15 parts by weight, with respect to 1 part by weight of the silicone ladder polymer, or the total amount of the silicone ladder polymer and the catalyst.

Preferably, the catalyst employed in the present invention hardly deteriorates electric characteristics, heat resistance etc. of a film which is obtained by applying the inventive composition onto a substrate and heat treating the same, as compared with those of a film which is formed with no addition of such a catalyst.

Examples of such a catalyst are aromatic azide compounds such as 3,3-diazide diphenylsulfone, 4,4'-diazide diphenylsulfone, 2,6-di(4'azidebenzal) cyclohexanone, 3,3'-diazide diphenylmethane, 4,4'-diazide diphenylmethane, 2,6-di(4'-azidebenzal)-4-methyl cyclohexanone, 4,4'-diazide diphenylmethane, 4,4'-diazidebenzal acetone and 4,4'-diazide chalcone, and aromatic sulfonyl azide compounds such as 3,3'-disulfonylazide diphenylsulfone, 4,4'-disulfonylazide diphenylsulfone, 3,3'-disulfonylazide diphenylmethane and 4,4'-disulfonylazide diphenylmethane. However, the materials for the catalyst are not restricted to such examples.

The silicone ladder polymer preferably contains 0.2 to 20.0 percent by weight, more preferably 0.3 to 15.0 percent by weight, of such a catalyst. If the concentration of the catalyst is less than 0.2 percent by weight, it is difficult to cure the film of the silicone ladder polymer at a low temperature, but the temperature for curing the film must be in excess of 270° C. If the concentration exceeds 20.0 percent by weight, on the other hand, the polymer thin film which is obtained with the catalyst has inferior heat resistance and electric characteristics as compared with a film obtained with no catalyst. A smaller concentration of the catalyst is preferable when a resin composition of particularly high purity is required or the thin film is formed on a relatively corrosive substrate such as that on which aluminum is deposited.

When the catalyst is employed, the silicone ladder polymer, the organic solvent and the catalyst may be mixed with each other in an arbitrary order for preparing the resin composition. The silicone ladder polymer and the catalyst may be added in this order to the organic solvent, or vice versa. The resin composition obtained in the above manner according to the present invention can be cured at a temperature of not more than 270° C., in a range of 150° to 270° C., for example. The cured thin film of the silicone ladder polymer has excellent solvent resistance.

A method of forming a thin film is now described. The inventive resin composition is applied onto a substrate by a method such as rotation application using a spinner, screen printing, potting or the like. Then, the resin composition is precured at 50° to 90° C. for 30 to 60 minutes, to partially remove the organic solvent. Then, the resin composition is further heat treated at 150° to 270° C. for 60 to 90 minutes, to completely remove the organic solvent while simultaneously obtaining a cured thin film.

The as-formed thin film of the silicone ladder polymer is usefully applied to an insulating layer or a surface protective coat. Since the polymer is curable at a low temperature of not more than 270° C., it is possible to form a thin film of this polymer on a substrate having low heat resistance. Further, the silicone ladder polymer of high purity is also applicable to a compound semiconductor device of GaAs or the like, a liquid crystal device, and the like.

The foregoing and other objects, features, aspects and advantages of the present invention will become more apparent from the following detailed description of the present invention.

DESCRIPTION OF THE PREFERRED EMBODIMENTS

Samples Nos. 1 to 10 of compositions were prepared as shown in Table 1.

ane and allyl trichlorosilane were employed in the sample No. 9 as raw materials respectively.

On the other hand, the compounds expressed in the formula (III) were employed for synthesizing silicone ladder polymers being expressed in the general formula (I), having $R^1$ to $R^4$ of methyl or ethyl groups. In the formula (III), $R^1$ to $R^4$ corresponded to R'. Further, Y appearing in the formula (III) corresponded to $R^5$ or $R^6$ of the general formula (I). For example, phenyl trimethoxysilane and vinyl trimethoxysilane were employed for synthesizing the silicone ladder polymer of the sam-

TABLE 1

| | Solvent | | Silicon Ladder Polymer | | | |
|---|---|---|---|---|---|---|
| Sample No. | Type | Amount (g) | Type of Side Chain Functional Group $(R^5/R^6)$*4 | Type of End Functional Group $(R^1-R^4)$ | Average Molecular Weight (Mw) | Amount (g) |
| 1 | toluene | 100 | $-CH_2CH_3/-CH=CH_2$ = 95/5 | H | $1.5 \times 10^5$ | 15 |
| 2 | anisole | 100 | $Ph/-CH=CH_2$ = 95/5 | $CH_3$ | $5.9 \times 10^4$ | 10 |
| 3 | methyl isobutyl ketone | 100 | $-CH_3/-CH=CH_2$ = 9/1 | H | $2.4 \times 10^5$ | 20 |
| 4 | NMP*2/DMAc*3 = 1/1*1 | 100 | $-CH_3/-CH_2CH=CH_2$ = 97/3 | $C_2H_5$ | $9.2 \times 10^4$ | 5 |
| 5 | anisole/DMAc = 1/1 | 100 | $-CH_2CH_3/-CH_2CH=CH_2$ = 9/1 | $CH_3$ | $3.7 \times 10^4$ | 5 |
| 6 | NMP/toluene = 1/1 | 100 | $Ph/-CH=CH_2$ = 9/1 | H | $2.1 \times 10^5$ | 15 |
| 7 | anisole | 100 | $Ph/-CH=CH_2$ = 95/5 | $CH_3$ | $3.2 \times 10^2$ | 15 |
| 8 | NMP/toluene = 1/1 | 100 | $-CH_3/-CH=CH_2$ = 9/1 | $C_2H_5$ | $9.4 \times 10^5$ | 10 |
| 9 | toluene | 100 | $-CH_3/-CH_2CH=CH_2$ = 97/3 | H | $7.5 \times 10^4$ | 20 |
| 10 | NMP/DMAc = 1/1 | 100 | $Ph/-CH=CH_2$ = 9/1 | $CH_3$ | $1.8 \times 10^5$ | 5 |

| | Catalyst | |
|---|---|---|
| Sample No. | Type | Amount (g) |
| 1 | 3,3'-diazide diphenylsulfone | 0.15 |
| 2 | 2,6-di(4'-azidebenzal)-4-methyl cyclohexanone | 0.12 |
| 3 | 4,4'-diazide diphenylsulfone | 0.04 |
| 4 | 3,3'-disulfonylazide diphenylsulfone | 0.02 |
| 5 | 4,4'-diazide chalcone | 0.10 |
| 6 | 2,6-di(4'-azidebenzal)-4-cyclohexanone | 0.12 |
| 7 | 2,6-di(4'-azidebenzal)-4-methyl cyclohexanone | 0.18 |
| 8 | 3,3'-disulfonylazide diphenylsulfone | 0.05 |
| 9 | 3,3'-diazide diphenylsulfone | 0.01 |
| 10 | 4,4'-diazide diphenylsulfone | 0.25 |

*1 volume ratio for two types
*2 N-methyl-2-pyrolidone
*3 N,N'-dimethyl acetamide
*4 molar ratio First, silicone ladder polymers were prepared from raw material compounds expressed in the following general formulas (II) and (III):

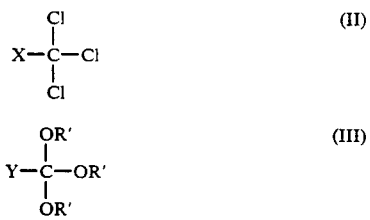

The compounds expressed in the formula (II) were employed for synthesizing silicone ladder polymers expressed in the general formula (I), having $R^1$ to $R^4$ of H. X appearing in the formula (II) corresponded to $R^5$ or $R^6$ of the general formula (I). In order to prepare the silicone ladder polymer of the sample No. 1, being expressed in the general formula (I) having phenyl and vinyl groups $R^5$ and $R^6$, for example, ethyl trichlorosilane and vinyl trichlorosilane were employed as raw materials. Similarly, methyl trichlorosilane and vinyl trichlorosilane were employed in the sample No. 3, phenyl trichlorosilane and vinyl trichlorosilane were employed in the sample No. 6, and methyl trichlorosilple No. 2. Similarly, methyl triethoxysilane and ally triethoxysilane were employed in the sample No. 4, ethyl trimethoxysilane and allyl trimethoxysilane were employed in the sample No. 5, phenyl trimethoxysilane and vinyl trimethoxysilane were employed in the sample No. 7, methyl triethoxysilane and vinyl triethoxysilane were employed in the sample No. 8, and phenyl trimethoxysilane and vinyl trimethoxysilane were employed in the sample No. 10 respectively.

In order to synthesize each of the silicone ladder polymers, the raw materials were previously refined by distillation in a nitrogen gas jet under decompression. These raw materials were carefully treated so that the same were not hydrolyzed by moisture contained in the air.

Then, the refined raw materials were mixed with and dissolved in an organic solvent of "ELSS grade" (high purity chemical for use in electronic industry) such as ethyl isobutyl ketone, ethyl ether or xylene. In each sample, the concentration of the raw materials was about 0.1 to 0.2 g/ml with respect to the organic solvent. In each sample, further, the mixing ratio of the raw materials corresponded to $R^5/R^6$ shown in Table 1. The solution containing the raw materials was transferred into a flask, which was provided with a thermometer and a stirring rod, and cooled. Then, extrapure water was dripped into the solution, which was stirred and cooled, for about 1 to 30 hours, to hydrolyze the solution. During this hydrolysis, the solution was held at a temperature of −5° to 25° C. After completion of such dripping, the solution was further stirred for 2 hours in order to complete the hydrolysis reaction. The hydrolysis reaction resulted in a prepolymer. An organic layer containing this prepolymer was recovered and washed with extrapure water of the same volume. After such washing was repeated 5 times, the organic layer containing the prepolymer was transferred into a flask of quartz glass, which was provided with a stirring rod made of fluorine-containing resin, a reflux condenser and a Dean-Start trap. The concentration of the prepolymer was 0.1 to 0.2 g/ml with respect to the organic layer. Then, a 0.1 g/ml potassium hydroxide solution in methanol (ELSS grade) was dripped into the flask, to cause a reflux with heating. The reacted solution was cooled at the room temperature, and thereafter tetrahydrofuran was added to the reacted solution with sufficient stirring, until the synthesized polymer was dissolved.

Then, methanol (ELSS grade) of at least 10 times was added to the solution, thereby precipitating a silicone ladder polymer having high molecular weight. The precipitate was recovered and again refined with tetrahydrofuran and methanol. Such refinement was repeated several times, to result in a silicone ladder polymer of high purity. The as-obtained silicone ladder polymer was dried to prepare each composition shown in Table 1.

Except for the sample No. 10, the silicone ladder polymers of the samples Nos. 1 to 9 synthesized in the aforementioned manner were analyzed through gel-permeation chromatography (TRI-ROTAR-VI by Nippon Spectroscope K.K.) as to molecular weight values, with an atomic absorption photometer (SAS-760 by Seiko Electronics Industry K.K.) as to concentrations of sodium, potassium, iron, copper and lead ions, through ion chromatography (IC-500 by Yokogawa-Hokushin Electric Appliances K.K.) as to chlorine ion concentrations, and with a fluorescence spectrophotometer (MPF-4 by K.K. Hitachi Seisakusho) as to contents of radioactive uranium and thorium. Table 2 shows the results.

TABLE 2

| | Silicon Ladder Polymer | | | | | | | | |
|---|---|---|---|---|---|---|---|---|---|
| Sample No. | Sodium ppm | Potassium ppm | Chlorine ppm | Iron ppm | Copper ppm | Lead ppm | Uranium ppb | Thorium ppb | Amount (g) |
| 1 | 0.87 | 0.79 | 0.85 | not more than 0.85 | not more than 0.85 | not more than 0.85 | not more than 1.0 | not more than 1.0 | 15 |
| 2 | 0.81 | 0.83 | 0.84 | not more than 0.85 | not more than 0.85 | not more than 0.85 | not more than 1.0 | not more than 1.0 | 10 |
| 3 | 0.85 | 0.89 | 0.90 | not more than 0.85 | not more than 0.85 | not more than 0.85 | not more than 1.0 | not more than 1.0 | 20 |
| 4 | 0.76 | 0.81 | 0.79 | not more than 0.85 | not more than 0.85 | not more than 0.85 | not more than 1.0 | not more than 1.0 | 5 |
| 5 | 0.91 | 0.90 | 0.93 | not more than 0.85 | not more than 0.85 | not more than 0.85 | not more than 1.0 | not more than 1.0 | 5 |
| 6 | 0.90 | 0.86 | 0.83 | not more than 0.85 | not more than 0.85 | not more than 0.85 | not more than 1.0 | not more than 1.0 | 15 |
| 7 | 0.82 | 0.79 | 0.75 | not more than 0.85 | not more than 0.85 | not more than 0.85 | not more than 1.0 | not more than 1.0 | 15 |
| 8 | 0.85 | 0.83 | 0.81 | not more than 0.85 | not more than 0.85 | not more than 0.85 | not more than 1.0 | not more than 1.0 | 10 |
| 9 | 0.90 | 0.92 | 0.85 | not more than 0.85 | not more than 0.85 | not more than 0.85 | not more than 1.0 | not more than 1.0 | 20 |

Each silicone ladder polymer shown in Table 1 was stirred and completely dissolved in a solvent of the amount shown in Table 1. Then, a catalyst of the amount shown in Table 1 was stirred, added to and dissolved in the solution to obtain a silicone ladder composition.

The as-obtained resin composition was applied onto a substrate, on which aluminum was deposited, with a spinner. Then, the resin composition was precured and heat treated under temperature and time conditions shown in Table 3.

TABLE 3

| | Thin Film Forming Condition | | | | Film Thickness | |
|---|---|---|---|---|---|---|
| | Precure | | Heat Treatment | | After Heat Treatment (μm) | After Dipping in Toluene for 1 min. (μm) |
| Sample No. | Temperature (°C.) | Time (min.) | Temperature (°C.) | Time (min.) | | |
| 1 | 70 | 30 | 200 | 60 | 3.1 | 3.1 |
| 2 | 80 | 30 | 180 | 60 | 2.8 | 2.8 |
| 3 | 50 | 60 | 200 | 90 | 3.5 | 3.5 |
| 4 | 90 | 45 | 270 | 60 | 2.5 | 2.5 |
| 5 | 80 | 30 | 150 | 90 | 3.2 | 3.2 |
| 6 | 90 | 45 | 250 | 60 | 2.9 | 2.9 |
| 7 | 80 | 30 | 200 | 60 | — | — |
| 8 | — | — | — | — | — | — |
| 9 | 70 | 30 | 200 | 60 | 3.0 | 0.2 |
| 10 | 90 | 45 | 270 | 60 | 3.2 | 3.2 |

Then, a thin film which was formed in a position separated by 3.0 cm from the center of the substrate was measured with a surface configuration measurer (Dektat 3030 by Slone K.K.). Thereafter the substrate, which was provided with the thin film, was dipped in toluene for 1 minute. After nitrogen gas was sprayed onto the substrate for removing toluene, the film thickness was measured with the surface configuration measurer at the same position as the above. Table 3 shows the results.

The samples Nos. 1 to 6 are preferable compositions. These compositions can form thin films which are undissolvable in organic solvents upon heating at temperatures of not more than 270° C.

On the other hand, the samples Nos. 7 to 10 are unpreferable compositions. In the composition of the sample No. 7, the coating was cracked upon heat treatment since the average molecular weight of the silicone ladder polymer was too small with an average degree of polymerization (n) of less than 5. The composition of the sample No. 8 was not completely dissolved in the organic solvent but left an aggregate of the polymer since the average molecular weight of the silicone ladder polymer was too large with an average degree of polymerization (n) exceeding 1600. As to the sample No. 9, it was necessary to cure the composition at a temperature of 350° C., which was substantially similar to that for curing a resin composition containing no catalyst, since the amount of the catalyst was too small. Thus, the composition was not sufficiently cured under the conditions shown in Table 3, but the heat treated coating was dissolved in the solvent to reduce the film thickness. While the sample No. 10 was sufficiently cured by heat treatment, aluminum was corroded by the excess amount of the catalyst, to deteriorate the quality of the film.

Then, compositions of samples Nos. 11 to 23 were prepared as shown in Table 4.

TABLE 4

| | Solvent | | Silicon Ladder Polymer | | | |
|---|---|---|---|---|---|---|
| Sample No. | Type | Amount (g) | Type of Side Chain Functional Group ($R^5/R^6$)*4 | Type of End Functional Group ($R^1$-$R^4$) | Average Molecular Weight (Mw) | Amount (g) |
| 11 | methyl isobutyl ketone | 100 | —$CH_2 CH_3$/—$CH=CH_2$ = 1/1 | $C_2H_5$ | $1.2 \times 10^5$ | 20 |
| 12 | toluene | 100 | —$CH_3$/—$CH=CH_2$ = 9/1 | H | $3.7 \times 10^4$ | 10 |
| 13 | anisole | 100 | —$CH_3$/—$CH_2CH=CH_2$ = 98/2 | $CH_3$ | $2.5 \times 10^5$ | 5 |
| 14 | methyl isobutyl ketone | 100 | Ph/—$CH=CH_2$ = 7/3 | $C_2H_5$ | $7.6 \times 10^4$ | 15 |
| 15 | NMP*2/anisole = 1/1*1 | 100 | —$CH_3$/—$CH_2 CH=CH_2$ = 9/1 | $CH_3$ | $4.6 \times 10^4$ | 10 |
| 16 | NMP/toluene = 1/1 | 100 | —$CH_2 CH_3$/—$CH_2 CH=CH_2$ = 9/1 | $CH_3$ | $5.3 \times 10^4$ | 5 |
| 17 | anisole/DMAc*3 = 1/1 | 100 | Ph/—$CH=CH_2$ = 95/5 | H | $1.7 \times 10^5$ | 15 |
| 18 | NMP/anisole = 1/1 | 100 | —$CH_3$/—$CH=CH_2$ = 6/4 | $C_2H_5$ | $6.7 \times 10^4$ | 20 |
| 19 | NMP/DMAc = 1/1 | 100 | —$CH_2CH_3$/—$CH=CH_2$ = 8/2 | H | $3.8 \times 10^4$ | 10 |
| 20 | toluene | 100 | —$CH_3$/—$CH_2 CH=CH_2$ = 95/5 | H | $3.2 \times 10^2$ | 20 |
| 21 | NMP/DMAc = 1/1 | 100 | Ph/—$CH=CH_2$ = 6/4 | $CH_3$ | $8.9 \times 10^5$ | 5 |
| 22 | anisole | 100 | —$CH_3$/—$CH=CH_2$ = 97/3 | H | $4.6 \times 10^4$ | 10 |
| 23 | NMP/toluene = 1/1 | 100 | Ph/—$CH_2 CH=CH_2$ = 99/1 | $C_2H_5$ | $1.5 \times 10^5$ | 15 |

| | Catalyst | |
|---|---|---|
| Sample No. | Type | Amount (g) |
| 11 | — | — |
| 12 | 4,4'-diazide chalcone | 0.17 |
| 13 | 4,4'-diazide diphenylsulfone | 0.15 |
| 14 | — | — |
| 15 | — | — |
| 16 | 2,6-di(4'-azidebenzal)-4-methyl cyclohexanone | 0.12 |
| 17 | 2,6-di(4'-azidebenzal)-4-cyclohexanone | 0.89 |
| 18 | 3,3'-diazide diphenylsulfone | 0.09 |
| 19 | 3,3'-disulfonylazide diphenylsulfone | 0.05 |
| 20 | 3,3'-diazide diphenylsulfone | 0.85 |
| 21 | — | — |
| 22 | 4,4'-diazide diphenylsulfone | 0.01 |
| 23 | 3,3'-disulfonylazide diphenylsulfone | 0.38 |

*1 volume ratio for two types
*2 N-methyl-2-pyrolidone
*3 N,N'-dimethyl acetamide
*4 molar ratio In a similar manner to the above, trichlorosilane compounds having groups corresponding to $R^5$ or $R^6$ were employed for silicone ladder polymers having $R^1$ to $R^4$ of H, while trialkoxyde compounds having groups corresponding to $R^5$ or $R^6$ were employed for silicone ladder polymers having $R^1$ to $R^4$ of alkyl groups as raw materials respectively. The silicone ladder polymers were synthesized in the same procedures as the above. The as-synthesized silicone ladder polymers were subjected to measurement of contents of sodium, potassium, chloride, iron, copper, lead, uranium and thorium similarly to the above. Table 5 shows the results.

TABLE 5

| | Silicon Ladder Polymer | | | | | | | | |
|---|---|---|---|---|---|---|---|---|---|
| Sample No. | Sodium ppm | Potassium ppm | Chlorine ppm | Iron ppm | Copper ppm | Lead ppm | Uranium ppb | Thorium ppb | Amount (g) |
| 11 | 0.91 | 1.05 | 2.13 | 1.11 | 1.58 | 1.00 | not more than 1.0 | not more than 1.0 | 20 |
| 12 | 1.32 | 1.92 | 1.68 | 1.33 | 1.62 | 1.21 | not more than 1.0 | not more than 1.0 | 10 |
| 13 | 1.52 | 1.73 | 2.01 | 1.62 | 1.29 | 1.36 | not more than 1.0 | not more than 1.0 | 5 |
| 14 | 0.93 | 1.26 | 1.19 | 1.46 | 1.34 | 1.05 | not more than 1.0 | not more than 1.0 | 15 |

TABLE 5-continued

| Sample No. | Silicon Ladder Polymer | | | | | | | | |
|---|---|---|---|---|---|---|---|---|---|
| | Sodium ppm | Potassium ppm | Chlorine ppm | Iron ppm | Copper ppm | Lead ppm | Uranium ppb | Thorium ppb | Amount (g) |
| 15 | 0.83 | 1.31 | 1.28 | 1.19 | 1.49 | 1.13 | not more than 1.0 | not more than 1.0 | 10 |
| 16 | 1.26 | 1.57 | 1.92 | 1.41 | 1.61 | 1.44 | not more than 1.0 | not more than 1.0 | 5 |
| 17 | 1.73 | 1.86 | 2.13 | 1.36 | 1.94 | 1.87 | not more than 1.0 | not more than 1.0 | 15 |
| 18 | 1.45 | 1.52 | 1.81 | 1.68 | 1.73 | 1.72 | not more than 1.0 | not more than 1.0 | 20 |
| 19 | 0.99 | 1.26 | 1.39 | 1.38 | 1.18 | 1.31 | not more than 1.0 | not more than 1.0 | 10 |
| 20 | 1.83 | 1.73 | 2.20 | 1.86 | 1.95 | 1.81 | not more than 1.0 | not more than 1.0 | 20 |
| 21 | 1.76 | 1.69 | 1.94 | 1.68 | 1.76 | 1.73 | not more than 1.0 | not more than 1.0 | 5 |
| 22 | 1.13 | 1.96 | 1.62 | 1.26 | 1.63 | 1.33 | not more than 1.0 | not more than 1.0 | 10 |
| 23 | 1.39 | 1.79 | 1.83 | 1.78 | 1.59 | 1.78 | not more than 1.0 | not more than 1.0 | 15 |

Each of the as-obtained silicone ladder polymers was mixed with/dissolved in a solvent and/or a catalyst in the composition shown in Table 4, to obtain a silicone resin composition. The as-formed resin composition was applied onto a silicone substrate with a spinner, and then precured and heat treated under the temperature and time conditions shown in Table 6. Then, the film thickness was measured before and after the film was dipped in an organic solvent, similarly to the above. Table 6 shows the results.

TABLE 6

| Sample No. | Thin Film Forming Condition | | | | Film Thickness | |
|---|---|---|---|---|---|---|
| | Precure | | Heat Treatment | | After Heat Treatment (μm) | After Dipping in Toluene for 1 min. (μm) |
| | Temperature (°C.) | Time (min.) | Temperature (°C.) | Time (min.) | | |
| 11 | 70 | 45 | 250 | 60 | 3.6 | 3.6 |
| 12 | 80 | 30 | 180 | 90 | 2.9 | 2.9 |
| 13 | 50 | 60 | 200 | 60 | 3.3 | 3.3 |
| 14 | 90 | 30 | 280 | 60 | 3.0 | 3.0 |
| 15 | 70 | 45 | 270 | 90 | 2.8 | 2.8 |
| 16 | 80 | 45 | 170 | 90 | 3.5 | 3.5 |
| 17 | 60 | 45 | 230 | 60 | 3.8 | 3.8 |
| 18 | 80 | 60 | 180 | 60 | 4.1 | 4.1 |
| 19 | 70 | 30 | 210 | 90 | 2.8 | 2.8 |
| 20 | 70 | 45 | 250 | 60 | — | — |
| 21 | — | — | — | — | — | — |
| 22 | 90 | 60 | 300 | 90 | 2.7 | 0.2 |
| 23 | 80 | 60 | 300 | 60 | 3.7 | 0.3 |

The samples No.s 11 to 19 are preferable compositions, which can provide thin films having solvent resistance at temperature of not more than 270° C., except for the sample No. 14.

On the other hand, the samples Nos. 20 to 23 are unpreferable compositions. In the composition of the sample No. 20, the coating was cracked upon heat treatment since the average molecular weight of the silicone ladder polymer was too small with an average degree of polymerization (n) of less than 5. The composition of the sample No. 21 was not completely dissolved in the organic solvent but left an aggregate of the polymer since the average molecular weight of the silicone ladder polymer was too large with an average degree of polymerization (n) exceeding 1600. In order to cure the composition of the sample No. 22, it was necessary to heat the same at a temperature of 350° C., which was substantially identical to that for curing a resin composition containing no catalyst, since the amount of the catalyst was too small. Therefore, the composition was not sufficiently cured under the conditions shown in Table 6, but the heat treated coating was dissolved in the solvent to reduce the film thickness.

The composition of the sample No. 23 was not sufficiently cured under the conditions shown in Table 6 but the heat treated coating was dissolved in the solvent to reduce the film thickness, since the content of alkenyl groups was too small.

As hereinabove described, the inventive silicone resin composition provides a thin film having excellent heat resistance and solvent resistance at a temperature of not more than 270° C.

Although the present invention has been described in detail, it is clearly understood that the same is by way of illustration and example only and is not to be taken by way of limitation, the spirit and scope of the present invention being limited only by the terms of the appended claims.

What is claimed is:

1. A silicone resin composition being curable at a temperature of not more than 270° C., said silicone resin composition consisting essentially of:

a silicone ladder polymer of the following general formula (I):

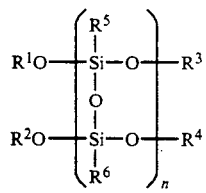

where $R^1$ to $R^4$ represent hydrogen atoms or lower alkyl groups respectively, $R^5$ and $R^6$ represent aryl groups, alkyl groups or alkenyl groups with alkenyl groups occupying at least 2% of 2n said groups $R^5$ and $R^6$, and n represents an integer of 5 to 1600; 0.2 to 20.0 percent by weight of a catalyst with respect to said silicone ladder polymer; and an organic solvent.

2. A silicone resin composition being curable at a temperature of not more than 270° C., said silicone resin composition consisting essentially of:
a silicone ladder polymer of the following general formula (I):

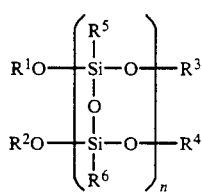

where $R^1$ and $R^4$ represent hydrogen atoms or lower alkyl groups respectively, $R^5$ and $R^6$ represent aryl groups, alkyl groups or alkenyl groups with alkenyl groups occupying at least 10% of 2n said groups $R^5$ and $R^6$, and n represents an integer of 5 to 1600; and
an organic solvent.

3. A composition in accordance with claim 1, wherein said silicone ladder polymer contains not more than 1 p.p.m. each of alkali metal, iron, lead, copper and halogenated hydrogen, and not more than 1 p.p.b. each of uranium and thorium.

4. A composition in accordance with claim 1, wherein said $R^1$, $R^2$, $R^3$ and $R^4$ represent methyl groups, ethyl groups or propyl groups.

5. A composition in accordance with claim 1, wherein said $R^5$ and $R^6$ are selected from a group of methyl groups, ethyl groups, vinyl groups, allyl groups and phenyl groups.

6. A composition in accordance with claim 1, wherein said organic solvent is prepared from one or at least two materials selected from the group consisting of aromatic hydrocarbons, ketones, ethers, anisole, N-methyl-2-pyrolidone and N,N-dimethyl acetamide.

7. A composition in accordance with claim 1, wherein the amount of said organic solvent is 2 to 20 times the total amount of said silicone ladder polymer and said catalyst.

8. A composition in accordance with claim 1, wherein said catalyst is prepared from an aromatic azide compound or an aromatic sulfonyl azide compound.

9. A composition in accordance with claim 1, wherein the amount of said catalyst is 0.2 to 20.0 percent by weight with respect to said silicone ladder polymer.

10. A composition in accordance with claim 1, wherein alkenyl groups occupy 5 to 8% of 2n said groups $R^5$ and $R^6$.

11. A composition in accordance with claim 1, wherein n represents an integer of 50 to 1000 in said general formula (I).

12. A composition in accordance with claim 2, wherein said silicone ladder polymer contains not more than 1 p.p.m. each of alkali metal, iron, lead, copper and halogenated hydrogen, and not more than 1 p.p.b. each of uranium and thorium.

13. A composition in accordance with claim 2, wherein said $R^1$, $R^2$, $R^3$ and $R^4$ represent methyl groups, ethyl groups or propyl groups.

14. A composition in accordance with claim 2, wherein said $R^5$ and $R^6$ are selected from a group of methyl groups, ethyl groups, vinyl groups, allyl groups and phenyl groups.

15. A composition in accordance with claim 2, wherein said organic solvent is prepared from one or at least two materials selected from the group consisting of aromatic hydrocarbons, ketones, ethers, anisole, N-methyl-2-pyrolidone and N,N-dimethyl acetamide.

16. A composition in accordance with claim 2, wherein alkenyl groups occupy at least 15% of 2n said groups $R^5$ and $R^6$.

17. A composition in accordance with claim 2, wherein n represents an integer of 50 to 1000 in said general formula (I).

18. A composition in accordance with claim 6, wherein the organic solvent comprises ethyl cellosolve.

19. A composition in accordance with claim 15, wherein the organic solvent comprises ethyl cellosolve.

* * * * *

UNITED STATES PATENT AND TRADEMARK OFFICE
CERTIFICATE OF CORRECTION

PATENT NO. : 5,236,984
DATED : August 17, 1993
INVENTOR(S) : Shigeyuki YAMAMOTO et al.

It is certified that error appears in the above-indentified patent and that said Letters Patent is hereby corrected as shown below:

On the title page, please delete item [75] and insert therefor:

--[75]  Inventors:  Shigeyuki Yamamoto; Hiroshi Adachi; Hirofumi Fujioka; Hirozoh Kanegae, all of Hyogo, Japan--

Signed and Sealed this

Twelfth Day of April, 1994

Attest:

BRUCE LEHMAN

*Attesting Officer*  *Commissioner of Patents and Trademarks*